(12) United States Patent
Lavender et al.

(10) Patent No.: US 6,748,378 B1
(45) Date of Patent: Jun. 8, 2004

(54) METHOD FOR RETRIEVING DATA FROM A DATABASE

(75) Inventors: Robert Lavender, Somerset (GB); James Lear, Bristol (GB)

(73) Assignee: Oracle International Corporation, Redwood Shores, CA (US)

(*) Notice: Subject to any disclaimer, the term of this patent is extended or adjusted under 35 U.S.C. 154(b) by 259 days.

(21) Appl. No.: 09/838,158

(22) Filed: Apr. 20, 2001

(51) Int. Cl.$^7$ ............................................. G06F 17/30
(52) U.S. Cl. ................... 707/5; 707/2; 707/100
(58) Field of Search .................... 707/1–10, 100–104.1, 707/200–206

(56) References Cited

U.S. PATENT DOCUMENTS

| | | | | |
|---|---|---|---|---|
| 5,724,570 A | * | 3/1998 | Zeller et al. ..................... | 707/3 |
| 5,852,822 A | * | 12/1998 | Srinivasan et al. ............. | 707/4 |
| 6,006,214 A | * | 12/1999 | Carey et al. ..................... | 707/2 |

OTHER PUBLICATIONS

Ganski et al., Optimization of Nested SQL Queries Revisite, ACM, 1987, 23–33.*

* cited by examiner

*Primary Examiner*—Shahid Alam
*Assistant Examiner*—Jean Bolte Fleurantin
(74) *Attorney, Agent, or Firm*—Swidler Berlin Shereff Friedman, LLP

(57) ABSTRACT

A method of generating a SQL statement for retrieving a data set from a database via a user interface and a database server and then processing the data set recursively. The method comprises the following steps:

a) inputting a nested n-pass expression to the user interface in a form that the database server cannot execute; and b) converting the nested n-pass expression into a SQL statement that the database server can execute, the SQL statement having a level of recursion for each level of nesting of the n-pass expression, each level of recursion operating in use on the results of at least one of the preceding levels.

12 Claims, 2 Drawing Sheets

METHOD FOR RETRIEVING DATA FROM A DATABASE

FIELD OF THE INVENTION

The present invention relates to relational databases and in particular to a method for retrieving data from such databases.

BACKGROUND TO THE INVENTION

The data stored in a relational database is commonly accessed and retrieved using a query and analysis tool. This acts as an interface, which may be graphical, between the user and the database with the purpose of hiding the complexity of the database query language, typically Structured Query Language (SQL), from the user.

For example, the database may contain a table named EMP which contains the names, salaries and departments of the employees of a company. The columns of this table may be entitled NAME, SAL and DEPT respectively. The user may require to rank the employees within each department by their annual salary. The corresponding SQL statement for this would be:

SELECT RANK ( ) OVER (PARTITION BY DEPT ORDER BY SAL) FROM EMP

However, using the query and analysis tool, the user could simply select an item known as "Rank by Annual Salary" which has been predefined to reference the above SQL statement. The query and analysis tool transfers the above SQL statement to the database for execution and presents the results generated to the user using an appropriate output device.

Such an SQL expression, where the data is first retrieved from the database and then processed in several passes, is known as an analytic or n-pass expression. Whilst this provides a powerful query tool, SQL does not currently allow one n-pass expression to reference another n-pass expression. As a result of this limitation, whilst it is possible to rank the employees in the above example by their total salary, it is not possible to rank them by their salary as a proportion of the total of all salaries.

SUMMARY OF THE INVENTION

In accordance with one aspect of the present invention, there is provided a method of generating a SQL statement for retrieving a data set from a database via a user interface and a database server and then processing the data set recursively, the method comprising the following steps:

a) inputting a nested n-pass expression to the user interface in a form that the database server cannot execute; and b) converting the nested n-pass expression into a SQL statement that the database server can execute, the SQL statement having a level of recursion for each level of nesting of the n-pass expression, each level of recursion operating in use on the results of at least one of the preceding levels.

Hence, a nested n-pass expression may be entered by the user and converted into a form that is executable by the database server. Thus, the previously mentioned limitation has been overcome.

In a preferred example, the n-pass expression is processed by a parser and the output from the parser is processed by a SQL transformation routine.

The parser validates the syntax of the n-pass expression and then creates a hierarchical tree of operators and operands from the n-pass expression.

The SQL transformation routine traverses the hierarchical tree, splits the hierarchical tree into sub-trees, each sub-tree representing one level of recursion of the SQL statement, and references the sub-trees using aliases.

In accordance with a second aspect of the invention, there is provided a method of retrieving a data set from a database via a user interface and a database server and then processing the data set recursively, the method comprising generating a SQL statement in accordance with the first aspect of the invention and subsequently performing the following steps:

c) transferring the SQL statement from the user interface to the database server;

d) executing the SQL statement; and e) transferring the result generated by the execution of the SQL statement from the database server to the user interface.

The user interface may be remote from the server and communicate with it over a medium such as the Internet, telephone, satellite, cable or other data link.

According to a third aspect of the invention, a computer program is provided for performing a method according to either the first or second aspects of the invention.

According to a fourth aspect of the invention, apparatus is provided for generating a SQL statement for retrieving a data set from a database and then processing it recursively, the apparatus comprising at least one store for storing the database, a database server, input means and a processor, the processor being adapted to execute a program for:

a) receiving a nested n-pass expression from the input means in a form that the database cannot execute; and b) converting the nested n-pass expression into a SQL statement that the database server can execute.

In a typical example, the program parses the nested n-pass expression and then transforms the parsed nested n-pass expression into an SQL statement.

The syntax of the nested n-pass expression is validated during the parsing operation and then a hierarchical tree of operators and operands is created from the validated n-pass expression.

The program traverses the hierarchical tree, splits the hierarchical tree into sub-trees and uses aliases to reference the sub-trees.

According to a fifth aspect of the invention an apparatus is provided for retrieving a data set from a database and then processing it recursively according to the fourth aspect of the invention, wherein the program subsequently:

c) transfers the SQL statement to the database server for execution; and d) receives the result generated by the execution of the SQL statement.

BRIEF DESCRIPTION OF THE DRAWINGS

Some examples of methods and apparatus according to the present invention will now be described with reference to the accompanying drawings, in which.

DETAILED DESCRIPTION OF THE EMBODIMENTS

Figure 1:
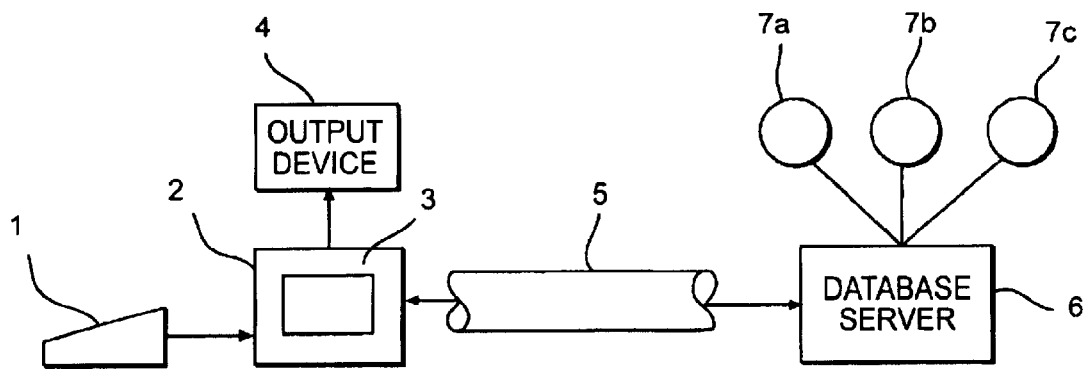
FIG. 1 is a block diagram of an example of the apparatus.

FIG. 1 shows an input device 1 such as a keyboard connected to a processor 2 which is executing a computer program 3 and which is connected to an output device 4, these constituting a user interface. The processor 2 is also connected to a database server 6 via a bidirectional communications channel 5. The communications channel 5 may be a direct connection using copper wire or optical fibre, a local area network, a modem communication channel using a public switched telephone network or alternatively, the Internet may be used. The database server 6 is connected to three stores 7a, 7b, 7c which store the data representing the database. A typical example of this arrangement is the Oracle Discover.

A user inputs a nested n-pass expression to the user interface 3 using the input device 1. The processor 2 converts the nested n-pass expression into a SQL statement that the database server 6 can execute using a method which will be described subsequently. The converted SQL statement is then transferred via the bidirectional communication channel 5 to the database server 6 where it is executed. The result generated by the execution of the SQL statement is then transferred back to the user interface, via communication channel 5, where it can be presented to the user using the output device 4. The output device 4 can be any of the well known output devices used with computer terminals, such as a monitor or a printer.

In order fully to understand the invention, it is helpful to consider a specific example of a nested n-pass expression that may be entered by the user and how that nested n-pass expression is converted into an SQL statement that the database server 6 can execute. For this purpose, a representative example of a data set that may be stored in the stores 7a, 7b, 7c connected to the database server 6 is shown in the table shown below named TEACHERS.

| TEACHERS | | |
|---|---|---|
| NAME | SUBJECT | SALARY |
| Smith | Physics | $2000 |
| Jones | Chemistry | $1900 |
| Green | English | $2100 |
| White | Physics | $1800 |
| Brown | French | $1950 |
| Perkins | English | $2000 |
| Barker | Mathematics | $1900 |
| Williams | Chemistry | $1800 |
| Collins | Mathematics | $1500 |
| Davis | English | $1800 |

This table is used to store the names of teachers within a school, the subjects that they teach and their monthly salary. It may be that the user wishes simply to calculate a rank for the teachers based on their salary. To do this the following n-pass expression would be entered by the user using the input means 1:

SELECT NAME, SUBJECT, SALARY, RANK ( ) OVER (ORDER BY SALARY) FROM TEACHERS

Figure 2:
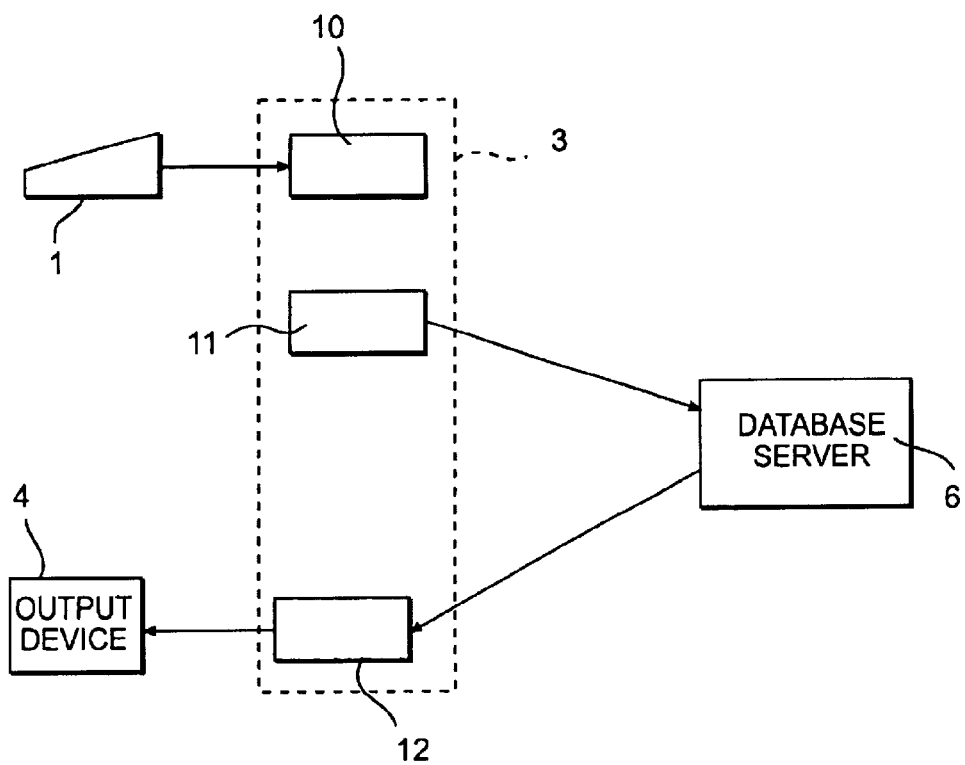
FIG. 2 is a flow diagram showing the sequence of operations carried out by the apparatus of FIG. 1.

The processing of this statement will now be described with reference to FIG. 2. Firstly, the user inputs the expression to the user interface using the input device 1. A parser 10 forming part of the program 3 then analyses the n-pass expression and upon recognizing that it is in a form that the database server 6 can execute, passes it to the database server 6 with no intermediate processing by an SQL transformation routine 11. The database server 6 then retrieves the name, subject and salary columns from the table "TEACHERS" and subsequently calculates a fourth rank column based on the teachers' salaries. This data set is then returned to the user interface where an output routine 12 causes it to be displayed by the output device 4. The output format may be as shown in the Table below:

| NAME | SUBJECT | SALARY | RANK |
|---|---|---|---|
| Green | English | £2100 | 1 |
| Perkins | English | £2000 | 2 |
| Smith | Physics | £2000 | 2 |
| Brown | French | £1950 | 4 |
| Barker | Mathematics | £1900 | 5 |
| Jones | Chemistry | £1900 | 5 |
| Davis | English | £1800 | 7 |
| White | Physics | £1800 | 7 |
| Williams | Chemistry | £1800 | 7 |
| Collins | Mathematics | £1500 | 10 |

However, it may be that the user requires to know the answer to a more complicated query such as the average value of the maximum salary earned for each subject taught. To do this the user would enter the following nested n-pass expression which the database server 6 cannot execute:

SELECT AVG(MAX(SALARY) OVER PARTITION BY SUBJECT) OVER ( )

Figure 3:
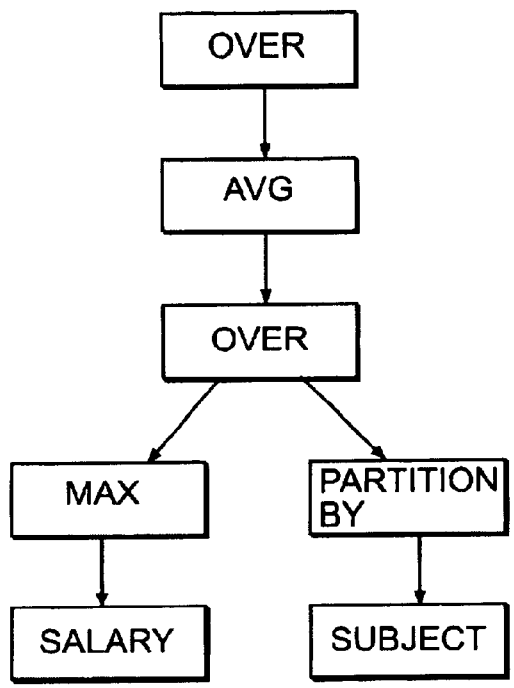
FIG. 3 shows a hierarchical tree of operators and operands.

The parser 10 analyses this expression and recognizes that it is not executable by the database server 6. Hence, the parser 10 decomposes the nested n-pass expression into individual operators and operands and from these creates a hierarchical tree as shown in FIG. 3.

This hierarchical tree of operators and operands is then passed to the SQL transformation routine 11. The SQL transformation routine 11 traverses the hierarchical tree of operators and operands in order to determine whether and to what extent the expression is nested. In this instance this is defined by the keyword OVER.

When the SQL transformation routine 11 finds a level of nesting, it splits the hierarchical tree into two sub-trees, one sub-tree referencing the other using an alias.

Figure 4:
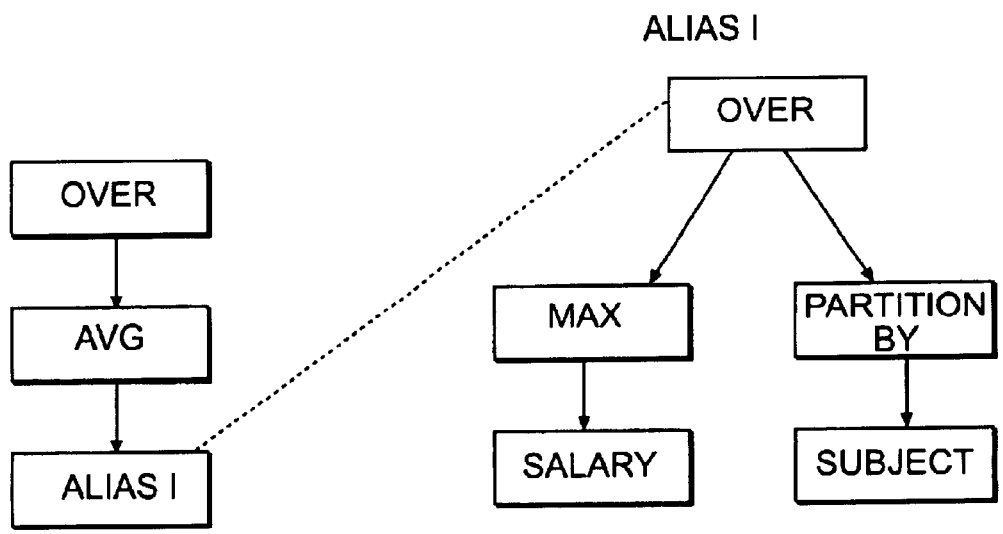
FIG. 4 shows this hierarchical tree after it has been split up into sub-trees.

This is shown in FIG. 4 where upon finding the second OVER keyword, the SQL transformation routine 11 has split the tree and inserted the alias "alias1". Since there are no other OVER keywords in this statement only two sub-trees are necessary.

These two sub-trees can then be reconstructed into the following SQL statement:

SELECT AVG(alias1) OVER ( ) AS AVERAGE
FROM (SELECT MAX(SALARY) OVER(PARTITION BY SUBJECT)
   AS alias1
   FROM TEACHERS)

This SQL statement is passed to the database server 6, via communication channel 5, for execution.

In response to this query the database server 6 firstly retrieves the data set from the database and then determines the maximum salary earned in each subject taught. This is performed by the MAX ( ) function which operates on the entire data set, partitioned in accordance with the SUBJECT column. The result of this operation is a reduced data set, referenced by alias "alias1", consisting only of the maximum salary earned for each subject taught.

The result, referenced by alias "alias1", is then operated on by the AVG ( ) function, which calculates the average of these maximum salaries. The result is then passed back to the user interface, via the communication channel 5, where the output routine 12 can display the result of 1970 to the user using display means 4. The output may be in the following format.

| NAME | SUBJECT | SALARY | AVERAGE |
|---|---|---|---|
| Smith | Physics | $2000 | $1970 |
| Jones | Chemistry | $1900 | $1970 |
| Green | English | $2100 | $1970 |
| White | Physics | $1800 | $1970 |
| Brown | French | $1950 | $1970 |
| Perkins | English | $2000 | $1970 |
| Barker | Mathematics | $1900 | $1970 |
| Williams | Chemistry | $1800 | $1970 |
| Collins | Mathematics | $1500 | $1970 |
| Davis | English | $1800 | $1970 |

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROMs, as well as transmission-type media, such as digital and analog communications links.

We claim:

1. A method of generating a SQL statement for retrieving a data set from a database via a user interface and a database server and then processing the data set recursively, the method comprising the following steps:
    a) inputting a nested n-pass expression to the user interface in a form that the database server cannot execute, wherein an n-pass expression is an analytic expression that specifies data to be retrieved from the database and then processed in a plurality of passes, and wherein the nested n-pass expression comprises at least one n-pass expression that references at least one other n-pass expression, and wherein each n-pass expression indicates data that is to be retrieved from the database and processed in a plurality of passes; and
    b) converting the nested n-pass expression into a SQL statement that the database server can execute, the SQL statement having a level of recursion for each level of nesting of the n-pass expression, each level of recursion operating in use on the results of at least one of the preceding levels.

2. A method according to claim 1, wherein the n-pass expression is processed by a parser and the output from the parser is processed by a SQL transformation routine.

3. A method according to claim 2, wherein the parser validates the syntax of the n-pass expression and then creates a hierarchical tree of operators and operands from the n-pass expression.

4. A method according to claim 3, wherein the SQL transformation routine traverses the hierarchical tree, splits the hierarchical tree into sub-trees, each sub-tree representing one level of recursion of the SQL statement, and references the sub-trees using aliases.

5. A method of retrieving a data set from a database via a user interface and a database server and then processing the data set recursively, the method comprising generating a SQL statement in accordance with claim 1 and subsequently performing the following steps:
    c) transferring the SQL statement from the user interface to the database server;
    d) executing the SQL statement; and
    e) transferring the result generated by the execution of the SQL statement from the database server to the user interface.

6. A computer program for performing a method according to claim 1.

7. A computer program for performing a method according to claim 5.

8. Apparatus for generating a SQL statement for retrieving a data set from a database and then processing it recursively, the apparatus comprising at least one store for storing the database, a database server, input means and a processor, the processor being adapted to execute a program for:
    a) receiving a nested n-pass expression from the input means in a form that the database server cannot execute; and
    b) converting the nested n-pass expression into a SQL statement that the database server can execute;
wherein an n-pass expression is an analytic expression that specifies data to be retrieved from the database and then processed in a plurality of passes, and
wherein the nested n-pass expression comprises at least one n-pass expression that references at least one other n-pass expression, and wherein each n-pass expression indicates data that is to be retrieved from the database and processed in a plurality of passes.

9. Apparatus according to claim 8, wherein the program parses the nested n-pass expression and then transforms the parsed nested n-pass expression into a SQL statement.

10. Apparatus according to claim 9, wherein the syntax of the nested n-pass expression is validated during the parsing operation and then a hierarchical tree of operators and operands is created from the validated n-pass expression.

11. Apparatus according to claim 10, wherein the program traverses the hierarchical tree, splits the hierarchical tree into sub-trees and uses aliases to reference the sub-trees.

12. Apparatus according to claim 7, wherein the program subsequently:
    c) transfers the SQL statement to the database server for execution; and
    d) receives the result generated by the execution of the SQL statement.

* * * * *

UNITED STATES PATENT AND TRADEMARK OFFICE
CERTIFICATE OF CORRECTION

PATENT NO. : 6748,378 B1
DATED : June 8, 2004
INVENTOR(S) : Robert Lavender and James Lear It is certified that error appears in the above-identified patent and that said Letters Patent is hereby corrected as shown below:

<u>Title page,</u>
Item [56], References Cited, OTHER PUBLICATIONS, change "Revisite" to
-- Revisited --

Signed and Sealed this

Twenty-seventh Day of July, 2004

JON W. DUDAS
*Acting Director of the United States Patent and Trademark Office*